United States Patent [19]

Rice

[11] Patent Number: 5,463,657
[45] Date of Patent: Oct. 31, 1995

[54] DETECTION OF A MULTI-SEQUENCE SPREAD SPECTRUM SIGNAL

[75] Inventor: Bart F. Rice, Santa Cruz, Calif.

[73] Assignee: Lockheed Missiles & Space Company, Inc., Sunnyvale, Calif.

[21] Appl. No.: 196,577

[22] Filed: Feb. 15, 1994

[51] Int. Cl.[6] ............................................ H04B 1/69
[52] U.S. Cl. .......................................... 375/200; 380/34
[58] Field of Search ............................ 375/1, 200, 208, 375/209, 210; 380/34

[56] References Cited

U.S. PATENT DOCUMENTS

| | | | |
|---|---|---|---|
| 4,672,629 | 6/1987 | Beier | 375/1 |
| 5,022,047 | 6/1991 | Dixon et al. | 375/1 |
| 5,063,571 | 11/1991 | Vancraeynest | 375/1 |
| 5,210,770 | 5/1993 | Rice | 375/1 |
| 5,218,619 | 6/1993 | Dent | 375/1 |
| 5,267,271 | 11/1993 | Rice | 375/96 |
| 5,341,395 | 8/1994 | Bi | 375/1 |
| 5,341,396 | 8/1994 | Higgins et al. | 375/1 |

OTHER PUBLICATIONS

M. Leonard, "Networked Controllers Talk Over Power Lines, " *Electronic Design*, Sep. 17, 1992, vol. 40, No. 19.
P. Enge and D. Sarwate, "Spread–Spectrum Multiple–Access Performance of Orthogonal Codes: Linear Receivers," *IEEE Transactions on Communications*, vol. COM–35, No. 12, pp. 1309–1319, Dec. 1987.
K. Pahlavan and M. Chase, "Spread–Spectrum Multiple–Access Performance of Orthogonal Codes for Indoor Radio Communications, " *IEEE Transactions on Communications*, vol. 38, No. 5, pp. 574–577, May 1990.
W. E. Stark and B. D. Woerner, "The Application of Trellis Coding Techniques to Direct–Sequence Spread–Spectrum Multiple Access Communications," *Proc. 26th Allerton Conf. on Communications, Control, and Computing*, pp. 1070–1079, 1988.
B. F. Rice, "A Transceiver Design for a High Information Rate LPI Network, "Proc. Milcom '90, pp. 49.1.1–49.1.4.
R. Kerr, "The CDMA Digital Cellular System: An ASIC Overview, " Proc. of the Third IEEE International Symposium on Personal, Indoor and Mobile Radio Communications,. pp. 2.2.1–2.2.6, Oct. 1992.
F. J. MacWilliams and N. J. A. Sloan, *The Theory of Error Correcting Codes*, North Holland Publishing Company, 1978.
N. Kuroyanagi and L. Guo, "Proposal of an Alternate M–Sequence Spread Spectrum System, "Proceedings Milcom '93, Oct. 1993.
R. Gold, "Optimal Binary Sequences for Spread Spectrum (List continued on next page.)

*Primary Examiner*—Tod R. Swann
*Attorney, Agent, or Firm*—Judson D. Cary; Edward J. Radlo

[57] ABSTRACT

A detector of a multiple-sequence spread spectrum signal uses a Hadamard transform (106) to simultaneously correlate a received signal comprising two sequences (64) with a plurality of candidate sequences. The received signal is stripped of the first sequence (65, 66), and the signal is permuted (via a table lookup) (104). A Hadamard transform is performed on the permuted data and the candidate sequences (106). After transformation, the data is permuted again (112) to determine the symbol (sequence) transmitted. Alternatively, Fast Fourier Transforms (FFTs) (FIG. 3), Winograd Fourier Transform Algorithms (WFTA), or other cyclic correlation algorithms (FIG. 5) may be used to compute the transformation. In a preferred embodiment, a "pilot" signal is transmitted in quadrature (90 degrees phase offset) with an information-bearing signal. And, a block error correcting code (150) (e.g., a modified Reed-Solomon code) is transmitted with the information-bearing signal a(t). The block length of the block error correcting code (150) is equal to an integral multiple of the period of the pilot signal. The period of the pilot signal is an integral multiple of the information bearing signal. Thus, carrier recovery, sequence synchronization, and block code synchronization are all achieved simultaneously by correlating (synchronizing) the received signal with a baseband version of the pilot signal.

9 Claims, 9 Drawing Sheets

OTHER PUBLICATIONS

Multiplexing," *IEEE Trans. On Information Theory,* vol. IT-13, pp. 119-121, Oct. 1967.

M. Simon, J. Omura, R. Scholtz, and B. K. Levitt, *Spread Spectrum Communications,* vol. 1, Computer Science Press, 1985, pp. 326-339.

D. Sarwate and M. Pursley, "Crosscorrelation Properties of Pseudorandom and Related Sequences," *Proc. of the IEEE,* vol. 68, No. 5, pp. 593-619, May 1980.

D. King, T. Mullen, B. Rice, P. Topping, N. Weyland, "Knowledge-Based FFT and Convolution Synthesis for Any Number of Points," *Mathematics and Computers in Simulation* 31 (1989), pp. 441-451.

J. C. Gower, "The Yates Algorithm," *Utilitas Mathematica,* vol. 21B, pp. 99-115, 1982.

Leon W. Couch II, Digital and Analog Comunication Systems, MacMillan Press 1990, pp. 130-133.

Joseph W. White, "What is CDMA?", *Applied Microwave & Wireless,* Fall 1993, pp. 5-8.

Bart F. Rice, "Sequence Generation and Detection for Variable Rate CDMA Networks" *Proceedings of the Second Annual Wireless Symposium,* Feb. 15-18, 1994.

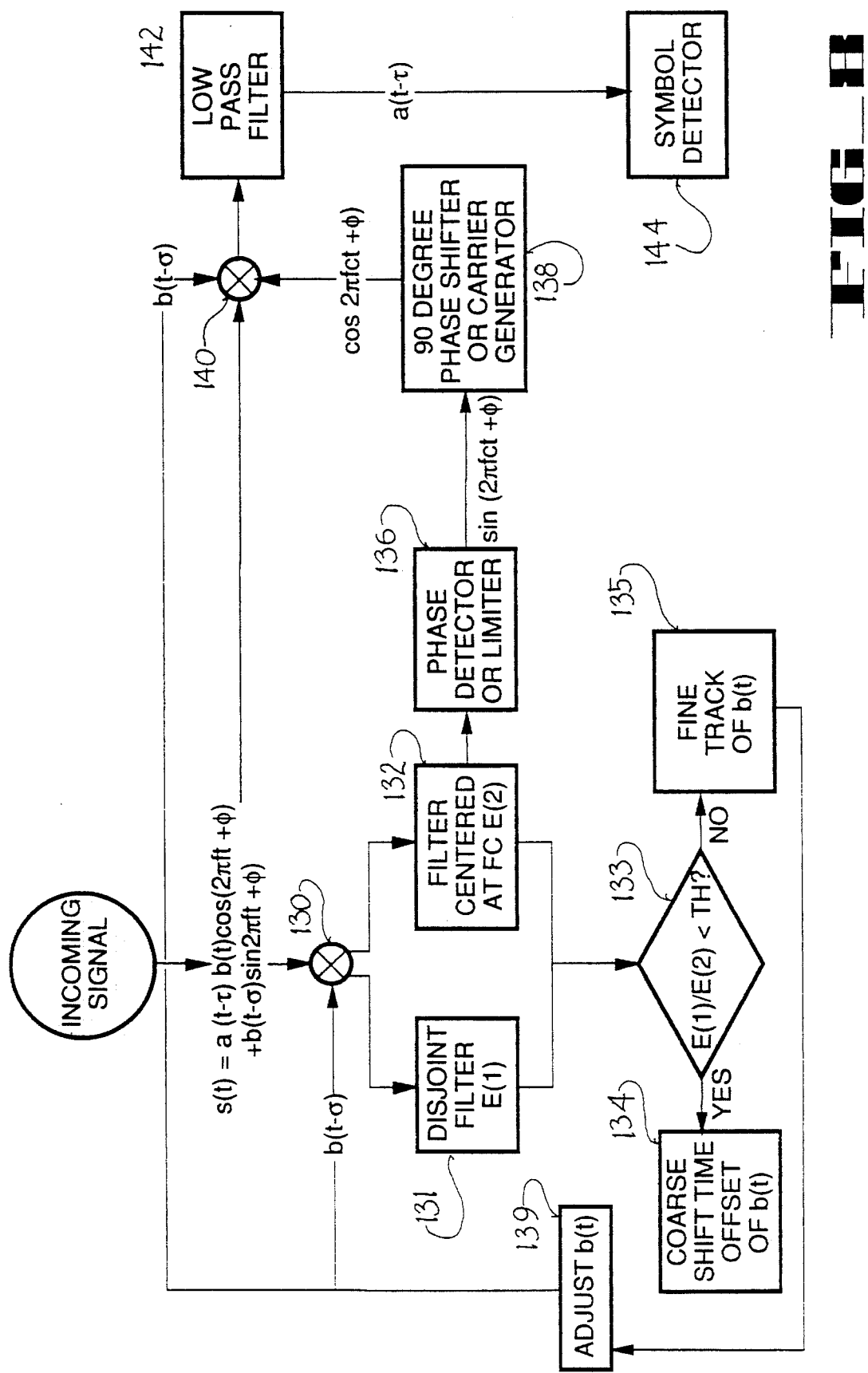

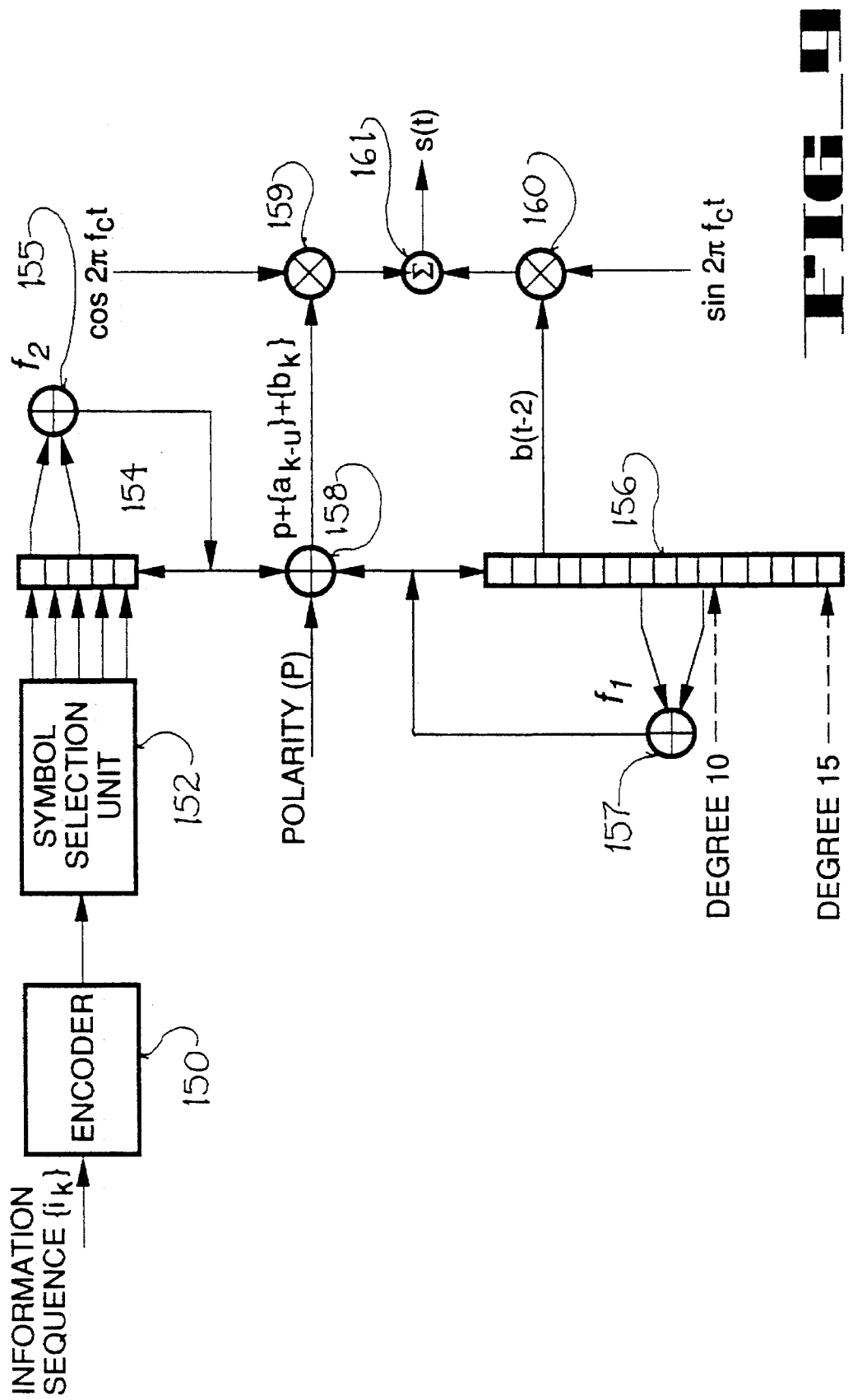
FIG_9

DETECTION OF A MULTI-SEQUENCE SPREAD SPECTRUM SIGNAL

CROSS-REFERENCE TO RELATED PATENT

The subject matter of this application is related to the subject matter of U.S. Pat. No. 5,210,770 "Multiple-Signal Spread-Spectrum Transceiver" (hereinafter referred to as Rice '770), also by Bart F. Rice, the disclosure of which is incorporated herein by reference.

BACKGROUND OF THE INVENTION

1. Field of the Invention

This invention relates to digital spread-spectrum communications and more particularly to a method and apparatus for detecting spreadspectrum signals employing multiple spreading sequences.

2. Description of Background Art

The field of wireless communications has been given a considerable impetus by Federal Communications Commission (FCC) Rule 15.247, which allows license-free operation of spread spectrum radios (subject to certain power restrictions) within the Industrial, Scientific, and Medical (ISM) bands: 902–928 MHz, 2400–2483.5 MHz, and 5725–5850 MHz. In response, several manufacturers have developed spread spectrum radios that operate in these bands (for example, Cylink, Omnipoint, Western Digital, Proxim, WinData). Spread spectrum communications and code division multiple access (CDMA) multiplexing are used in areas such as wireless communication, local area networks (LANs), personal communications networks (PCNs), and cellular telephone networks.

A conventional direct sequence spread spectrum signal can be viewed as the result of mixing a narrowband information-bearing signal $i(t)$ with an informationless wideband (and constant envelope) "spreading" signal $c(t)$. If $B_i$, $B_c$ denote the bandwidths of $i(t)$, $c(t)$, respectively, then the "processing gain" available to the receiver is $G=B_c/B_i$, which can be realized (with some implementation losses, of course) by synchronizing the incoming signal to a locally generated version $c_O(t)$ of $c(t)$, mixing the received signal and $c_O(t)$, thus removing $c(t)$ from the signal and "collapsing" the signal to the "information bandwidth" $B_i$, within which the despread signal should have sufficient signal-to-noise ratio (SNR) to enable recovery of the information by standard means.

To increase the data rate in CDMA communication for a given chip rate and processing gain, multiple spreading sequences are used (see, for example, Rice, U.S. Pat. No. 5,210,770 "Multiple-Signal Spread-Spectrum Transceiver", and Vancraeynest, U.S. Pat. No. 5,063,571 "Method and Apparatus for Increasing the Data Rate for a Given Symbol Rate in a Spread Spectrum System"). By utilizing multiple periodic sequences, it is possible to increase the information rate with less loss in processing gain and concomitant increase in bit error rate than would result if the bandwidth $B_i$ of the information signal were increased directly.

In a multiple sequence spread spectrum system, fixed lengths of each sequence are regarded as symbols that convey multiple bits of information. If the sequences are (nearly) "orthogonal" over the length of a symbol (their cross correlations are 0, or very nearly 0, compared to the sequence length), then they are the same distance apart regardless of their number. It is this fact that explains why using multiple sequences to increase data rate provides an improvement in performance over that obtained if the data rate is increased by simply increasing the bandwidth $B_i$ of the information signal $i(t)$, thereby directly decreasing the processing gain, G. In addition, a performance improvement in terms of capacity (number of users times data rate per user) is also realized by using multiple sequences in a spread spectrum code division multiple access (CDMA) network or a hybrid CDMA/FDMA/TDMA network.

When using multiple sequences it is important that the sequences not be merely time offsets of one another or else false synchronization could occur and symbols could be interpreted incorrectly (see, for example, Vancraeynest). One method that guarantees the independence of the spreading sequences at all offsets of one another is to add modulo-2 a pseudo-random sequence to whichever information-bearing sequence is to be transmitted. This approach also provides a large measure of flexibility in choosing data rates and processing gains (see, for example, Rice '770), and it enlarges the "code space" so that many users can be assigned unique spreading sequences.

A spread spectrum system that employs multiple sequences is the QUALCOMM CDMA system. In the QOUALCOMM system, the rows of a Hadamard matrix are used as spreading sequences. In one mode of operation, each row corresponds to multiple bits of information. The "chip sequence"(i.e., the bits that form the spreading-code sequence) is formed by combining (by modulo-2 addition) the bits of an independently generated sequence and a selected row of the Hadamard matrix, where the row corresponds to the information to be conveyed in the time required to transmit the bits in the given row (the "symbol interval"). This aspect of the QUALCOMM coding scheme is a slight variation of a Type 1 Reed-Muller code, a type of low-rate code that was employed in deep-space communications in the early days of the United States space program.

The QUALCOMM detection scheme first "strips" an "informationless" sequence from the received signal and then determines which row of the Hadamard matrix was transmitted by correlating the "stripped" signal with each row of the Hadamard matrix by computing a Fast Hadamard Transform (FHT), or Yates' Algorithm. The FHT on $N=2^n$ points is the most efficient of the Fast Fourier Transform (FFT) algorithms, as it requires no multiplications or divisions and only $N \times \log_2(N)$ adds/subtracts (real or complex as the input data is real or complex). The index of the transform coefficient with the largest magnitude indicates the transmitted row (according to the Maximum Likelihood decision rule).

In general, there is a need for a reliable and efficient technique for detecting spread-spectrum signals where the sender employs multiple spreading sequences for transmitting information (where the sequences are not rows of a Hadamard matrix). In addition, there is a need for a method for simultaneously correlating a received signal with all of the sequences possibly employed by the sender of a spread spectrum signal. Such a "block correlator" also requires an accurate method for carrier recovery and tracking, to bring the received signal to baseband. It is also advantageous to simultaneously accomplish carrier recovery, synchronization with the information bearing sequence, and synchronization with an error-correcting block code. Furthermore, there is a need for logic designs for hardware implementation of such processes and methods. The present invention addresses these needs and solves the problems presented.

DISCLOSURE OF INVENTION

The invention comprises a detector of a multiple-sequence spread spectrum signal. The received signal is first brought to baseband. Chip-synchronized and frame-synchronized samples (real or complex) of the received signal (64) are stripped of a first component spreading sequence (65, 66). In one embodiment, the resulting signal is correlated simultaneously and in parallel with each of the possibly transmitted sequences (FIG. 2 ). In another embodiment, the resulting signal is accumulated in a block of length equal to the common period of the sequences possibly transmitted (67) and is simultaneously correlated with all offsets of a second component sequence using transform techniques (68). In the preferred embodiment, the transforms are Hadamard transforms (FIG. 6). The Hadamard transform is preceded by a permutation (104) of the input sequence. Alternatively, the transforms may be one-dimensional discrete Fourier Transforms implemented using, for example, a Fast Fourier Transform (FFT) algorithm (FIG. 4), or a Winograd Fourier Transform Algorithm (WFTA) and cyclic convolution algorithms (FIG. 5).

In a preferred embodiment, an informationless "pilot" sequence is transmitted in quadrature with the information bearing signal. Furthermore, information bearing signal can comprise a block error-correcting code (150). The block length of the block error correcting code (150) is equal to an integral multiple of the period of the pilot signal. The period of the pilot signal is an integral multiple of the information bearing signal. Thus, carrier recovery, sequence synchronization, and block code synchronization are all achieved simultaneously by correlating (synchronizing) the received signal with a baseband version of the pilot signal.

The present invention can be used in, for example, CDMA or mixed FDMA/TDMA/CDMA cellular communications or personal communication systems (PCS); spread spectrum over fiber channels; communications in license-free ISM bands; hybrid frequency-hopped and direct sequence spread spectrum tactical systems; traffic control; automatic toll taking; or any communications application that requires multipath rejection, interference tolerance, low interference to other users, robustness, and other advantages of direct sequence spread spectrum yet requires higher data rates and greater flexibility in data rates than normally provided by such systems.

The present invention is advantageous where bandwidth is limited (for example transmission over power lines, underwater, or other difficult channels), because increased data rate and processing gain can be achieved. The invention also provides flexibility in data rates; rapid synchronization enabling either synchronous or asynchronous operation; the ability to vary sequence length as well as power; and, enables threshold comparisons for detection of fades or loss of signal.

BRIEF DESCRIPTION OF THE DRAWINGS

FIG. 8 is a schematic illustration of a carrier recovery and synchronization system for a signal that includes an information-bearing signal and an informationless, or pilot, signal.

FIG. 9 is a schematic illustration of a system in which forward error correction coding using a block code is combined with transmission of an informationless arm.

DETAILED DESCRIPTION OF THE PREFERRED EMBODIMENTS

Sequence Generator

Figure 1:
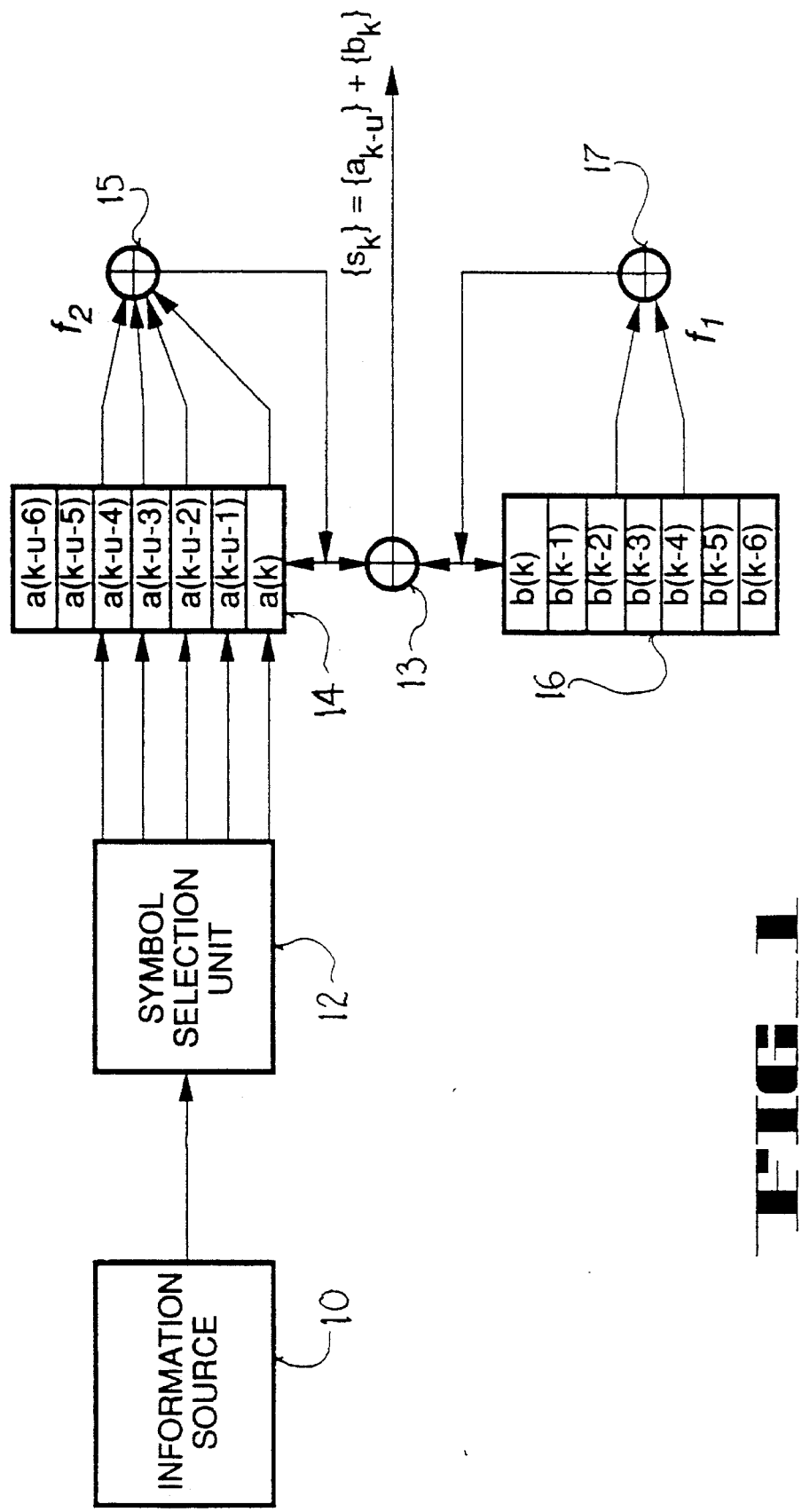
FIG. 1 is a schematic illustration of a system for generating spreading sequences for use in a multiple sequence spread spectrum system.

In FIG. 1, a sequence generator for generating a multi-sequence spread-spectrum signal $\{s_k\}$ is shown. Information source 10 produces a sequence of information bits $\{i_k\}$. These bits are blocked into groups of $m \leq n$ bits where $2^m$ is the number of sequences employed, and where n is the degree of polynomial $f_2(x) \in GF(2)[x]$, whose non-zero coefficients correspond to the feedback taps of linear feedback shift register 14. The degree of polynomial $f_1$ and $f_2$ is observed by counting the number of stages or slots from the center, (lowest slot on upper register 14 or highest slot of lower register 16) to the last tap on register 14, 16. In FIG. 1, both polynomials are of degree 5, however, polynomials $f_1$ and $f_2$ can be of different degree. In symbol selection unit 12, each block of m bits is identified (via lookup table) with an n-bit "fill". A "fill" is a block of n bits that are "switched in" to the lower n bits of upper register 14 at the beginning of each symbol interval. Because arbitrary fills can be switched into the register, the number of sequences available to a user is limited only to $2^n$ (in FIG. 1, $2^5=32$). Consequently, $2^n$ fills and therefore a maximum of $2^n$ sequences are available and could be assigned to a single user.

The sequence generated by lower register 16 is arbitrary. Thus, it is not necessary that there be any relationship between the sequences propagating in the upper and lower registers. Indeed, in synchronous communications, only the sequence in the upper register need be periodic. The main purposes of the sequence in the lower register are to enable acquisition and maintenance of synchronism and detection of false synchrony and to enlarge the address space.

Sequences are assigned to a user by specifying (1) a pair of polynomials, (2) the number $2^m$ of sequences allocated to that user, and (3) an "initial fill"(the lower register can be assumed to contain the "impulse fill,"00 . . . 01). The initial fills corresponding to the $2^m$ sequences are the specified fill and the $2^{m-1}$ fills that appear in the register as it is stepped $2^{m-1}$ times, starting with the specified fill.

For example, suppose n=10 and all 1024 sequences of period 1023 are assigned to a single user, each sequence corresponding to a distinct initial fill of ten bits. This user can transmit eleven bits of information per symbol (1023 chips), ten bits corresponding to the sequence selected for transmission and an eleventh (differential) bit of information conveyed by the "polarity," or sign, of the sequence: if the eleventh bit is unchanged from the last symbol, the sequence is transmitted "upright"(as is); if it changes from 0 to 1 or from 1 to 0, the sequence is "inverted" modulo-2 In general, the data rate, $f_d$ (ignoring coding and including the polarity bit), the chip rate, $f_c$, the sequence length, $2_n\_1$, and the number of sequences, $n_s$ (assumed to be $2^m$ for some integer $m \leq n$), employed by a user are related by the equation $f_d = f_c(m+1)/(2^n-1)$.

A user's data rate can be increased/decreased by approximately a factor of 2 and processing gain decreased/increased commensurately by approximately 3 dB by decreasing/increasing n by 1. This can be done dynamically, in response to detection performance. Also, by increasing m to m+1, an additional bit per period of information can be transmitted, at the cost of reducing the number of sequences available to other users by $2^m$. Data rate can also be varied by sending multiple sequences simultaneously. Thus, by varying a user's parameters, variable rates and variable processing gains can be accommodated within a single CDMA network.

Detector#1

Use of "combined," or "composite" sequences, such as those generated according to FIG. 1, or in Rice '770, has several advantages for detection of the multi-sequence spread spectrum signal. If the M-sequence of degree n (where n is the degree of the polynomial, $f_2$, that "drives" upper register 14) of 0's and 1's emanating from a particular stage of one register 14 (e.g., upper register) is denoted by $\{a_k\}$, and if the sequence of 0's and 1's emanating from a corresponding particular stage of another register 16 (e.g., lower register) is denoted by $\{b_k\}$, the (2M–1) spreading-code sequences available from the modulo-2 adders 13, 15, 17 are $\{a_{k-i}+\}$ and $\{a_k+b_{k-i}\}$, for $i=1, 2, \ldots, M-1$. The spreading sequences assigned to a given user are of the form $\{a_{k-u}+b_k\}$ and/or $\{a_k+b_{k-v}\}$ for some offsets u and v. Here, $\{b_k\}$ can also (but does not necessarily have to) be another M-sequence of degree n, or any integer multiple if n. A given user can be assigned any number of sequences up to $2^n$. If, for example, $2^m$ sequences corresponding to contiguous values of u and v are employed by a given user, and if $2^m$ does not exceed the sum of the number of stages in the shift registers that generate the component sequences (2M–1 if each resister has M stages) then correlations of the received, chip-synchronized signal $\{s_k\}$ with each of the candidate sequences $\{a_{k-u}+b_k\}$ and $\{a_k+b_k-v\}$ can be performed simultaneously using the technique depicted in FIG. 2.

Figure 2:
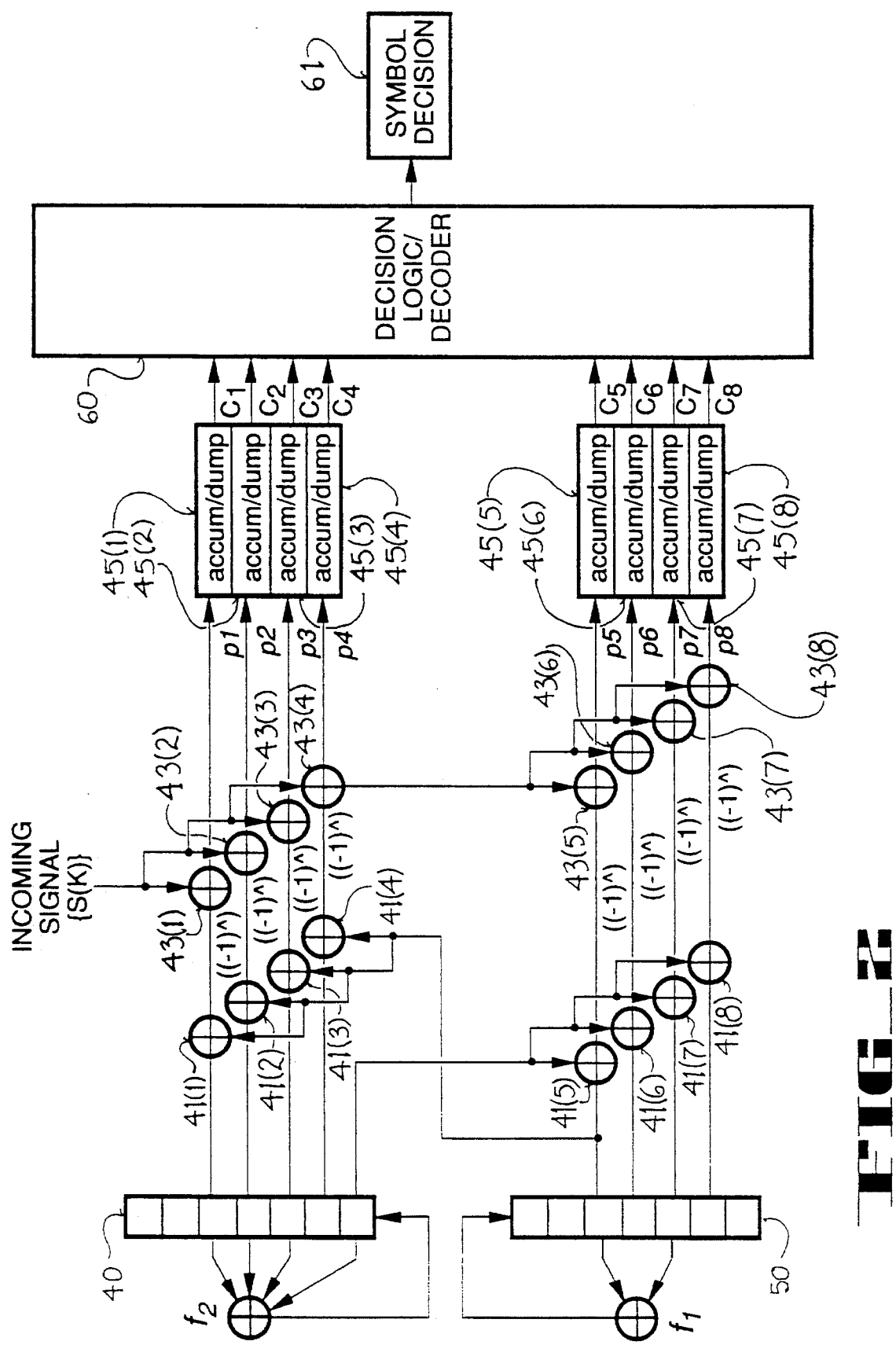
FIG. 2 is a schematic illustration of a detection system for a spread spectrum signal in which the sender employs multiple spreading sequences for transmitting information where the number of candidate sequences is less than the number of stages in the generating registers.

In FIG. 2, a detection system for a spread spectrum signal $\{s_k\}$ in which the sender employs multiple spreading sequences for transmitting information is shown. Eight sequences are shown, however, the number of sequences can be any number up to 2M–1, where M is the number of stages in each register 40, 50. Detection of the transmitted sequence is tantamount to determination of the type of spreading sequence transmitted, $\{a_{k-u}+b_k\}$ or $\{a_k+b_{k-v}\}$, and the correct offset, u or v. In FIG. 2, the sequences are of the form $\{a_{k-u}b_{k-2}\}$ for u= 1, 2, 3, 4, and $\{a_kb_{k-v}\}$ for v= 2, 3, 4, 5. The first step is to correlate the incoming signal $\{s_k\}$ with each possibly transmitted output or candidate sequence $\{a_{k-u}+b_k\}$ and $\{a_k+b_{k-v}\}$. Accordingly, as in the transmitter, upper register 40 and lower register 50 generate sequences $\{a_k\}$ and $\{b_k\}$ according to functions $f_2$ and $f_1$, respectively. The sequences are added mod 2 at adders 41(1)–41(8) to produce the possible sequences $\{a_{k-u}+b_k\}$ and $\{a_{k+bk-v}\}$. Each sequence so generated is then converted to a sequence of +1's and –1's ((–1)ô) and multiplied 43(1)–43(8) by the incoming chip-synchronized baseband signal { sk} to form a set of products P1, P2, . . . , P8. Correlation values $\{c_k\}$ are produced by integrating the products in accumulate-and-dump filters 45(1)–45(8). Once per symbol interval (nominally the period of$\{a_k\}$) accumulators 45(1)–45(8) are dumped and input to decision logic decoder 60. Accumulators 415(1)–45(8) are then zeroed, and the process is repeated. Based on the correlation values $\{c_k\}$, decision logic decoder 60 makes a decision as to what "symbol" or output data sequence 61 was transmitted. A maximum likelihood detection scheme, for example, can be used to identify the correct sequence—i.e., a sequence is determined to have been transmitted if the correlation of that sequence with incoming signal $\{s_k\}$ has the largest magnitude. Alternatively, the decision logic scheme discussed in Rice '770 can be employed.

To obtain useful results from the correlations $\{c_k\}$, the signal $\{s_k\}$ must be at baseband. Thus, carrier recovery and tracking is critical in this, or other, multiple-sequence systems. Signal $\{s_k\}$ is also chip-synchronized with each of the possibly transmitted output sequences $\{a_{k-u}+b_k\}$ and $\}a_kb_{k-v}\}$. The multiply-accumulates in multiply/accumulate/dump filters 45(1)–45(8) are performed in parallel as $\{s_k\}$ is received with the generated sequences $\{a_{k-u}+b_k\}$ and $\{a_k+b_{k-v}\}$. Thus, the same circuitry that is used to generate the sequences in the transmitter can be used in the receiver to replicate them. Using the present signal detection invention, correlation values are available immediately after the last chip of the received symbol $\{s_k\}$ is received. These correlation values can be processed to make a decision on the past symbol before the end of the next symbol interval.

Detector #2

Figure 3:
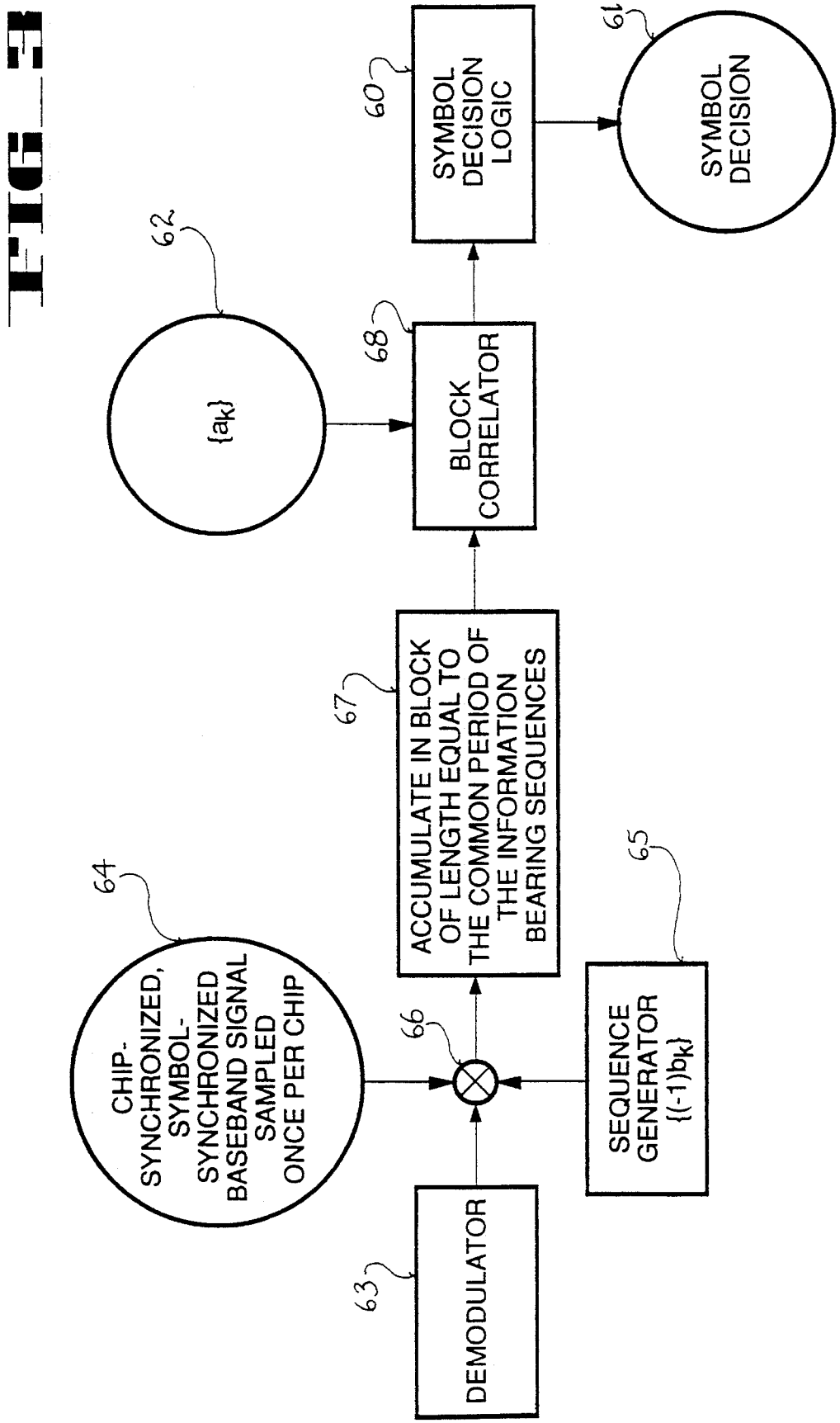
FIG. 3 schematic illustration of a multiple-sequence spread spectrum receiver in which a block correlation method is used to simultaneously correlate a received signal with each possible candidate sequence.

If $2^m$ is larger than the number of available register stages, 2M–1, the method shown in FIG. 2 cannot be applied because the number of sequences would exceed the number of available register locations. Instead, the method illustrated in of FIG. 3 can be applied. Similar to FIG. 1, a multiple-sequence spread spectrum signal $\{s_k\}=\{a_{k-u} \oplus b_k\}$ (only one offset of one of the sequences is employed) is generated 13 and modulated for transmission in a channel. Received signal $\{s_k\}$ can be correlated in the receiver with all possible sequences simultaneously in a "block correlator" using fast transform techniques. Incoming signal 64 $\{s_k\}$ is first brought to baseband, chip-synchronized, and symbol (sequence) synchronized in demodulator 63. Detection of the transmitted sequence is equivalent to determination of the correct offset u. A replica of $\{b_k\}$ is generated in receiver 65. The $\{b_k\}$ component sequence of incoming signal$\{s_k\}$ is synchronized with the replicated sequence $\{b_k\}$. The$\{b_k\}$ component sequence is then "stripped" from incoming signal $\}s_k\}$ by multiplying $\{s_k\}$ by $(-1)^{bk}$ at 66. The result of the stripped signal is accumulated 67 over a period of the sequence $\}a_k\}$. The accumulated period is then "block correlated"68 with a replica of $\{a_{k-u}\}$ at every offset u $(0 \leq u \leq 2^n-2)$ 62 using fast transform techniques 68. Block correlator 68 can be implemented, for example, using: (1) efficient Discrete Fourier Transforms DFTs such as the Fast Fourier Transform FFT (FIG. 4), (2) cyclic convolution algorithms such as the Winograd Fourier Transform Algorithm (WFTA) and/or other cyclic convolution algorithms (FIG. 5), or, (3) Fast Hadamard Transforms (FHTs) (FIG. 6).

Figure 4:
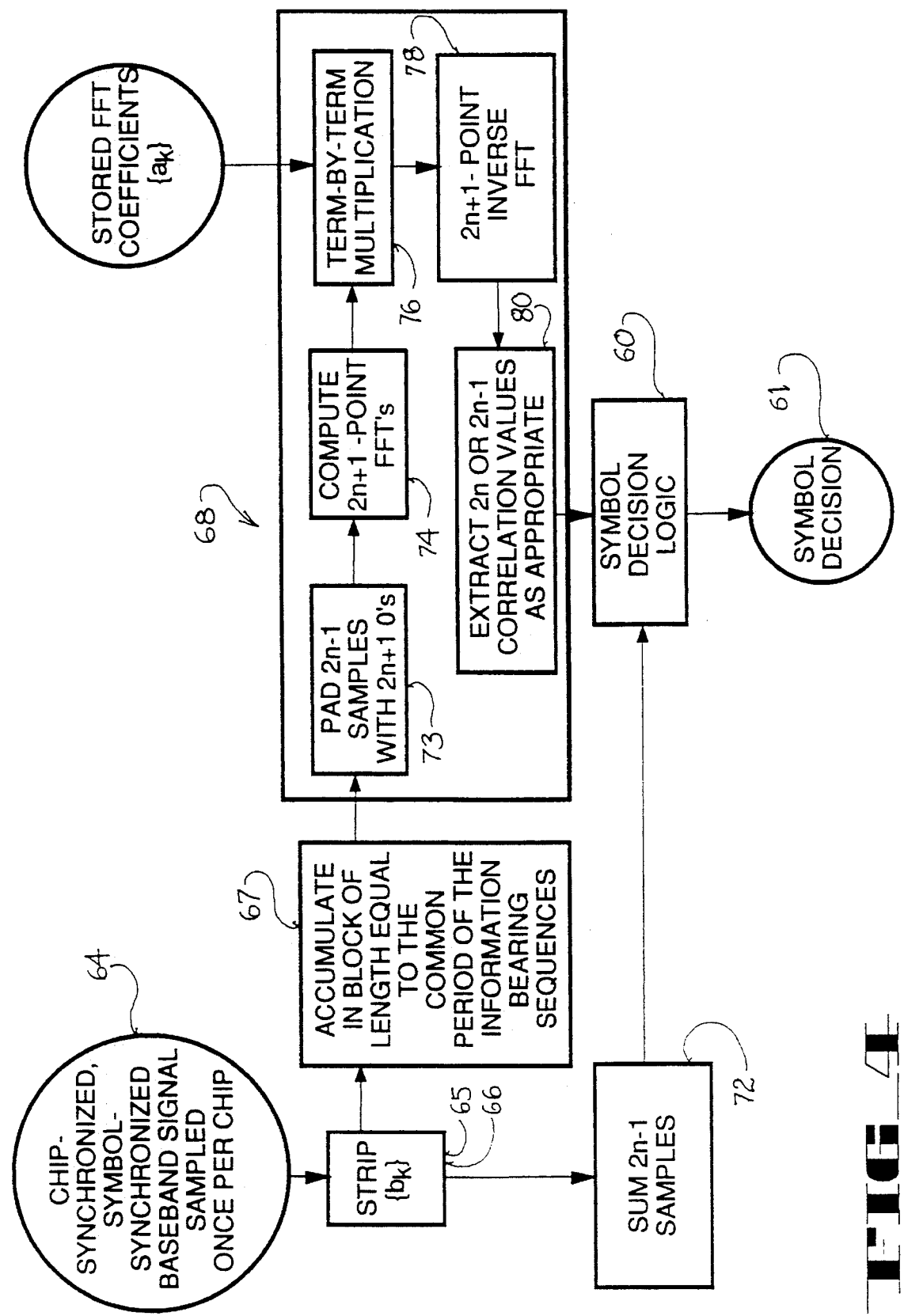
FIG. 4 is a flow chart illustrating a block correlation method using fast Fourier transforms (FFTs) to correlate a received signal with each possible candidate sequence.

FIG. 4 shows a block correlator using fast Fourier transforms (FFTs). The sequence $\{b_k\}$ is "stripped"65, 66 from incoming signal$\{s_k\}$64 (sampled once per chip) by performing the multiplication $\{s_k(-1)^{b_k}\}=\{qk\}$. The correlation with the all-0 sequence is the sum of the $2^n-1$ values of $\{qk\}$ 72. The stripped signal is accumulated 67 over a period of the sequence To obtain the remaining $2^n-1$ correlation values, each of the $(2n-1)$-long sequences $\{qk\}$ is appended or padded with $2^n+1$ O's at 73. The $2^{n+1}$-point FFTs of each of the resulting sequences is computed 74. Each of the $(2^n-1)$long sequences $\{(-1)^{a_k}\}$ is also padded with $2^n+1$ O's, and the $2^{n+1}$- point FFTs of each of the resulting sequences is computed. The complex conjugates of the resulting transform can be stored 75 in the receiver. Corresponding transform coefficients 74, 75 are multiplied term-by-term 76. After term-by-term multiplication 76, the $2^{n+1}$-point inverse FFTs are calculated 78. The first $2^n-1$ elements of the resulting vector comprise the desired correlation values $\{c_k\}$ 80 ($2^n$ elements including the correlation with the all-0 sequence). Based on the correlation values $\{c_k\}$, design logic decoder 60 makes a decision as to what "symbol"(sequence) 61 was transmitted.

Figure 5:
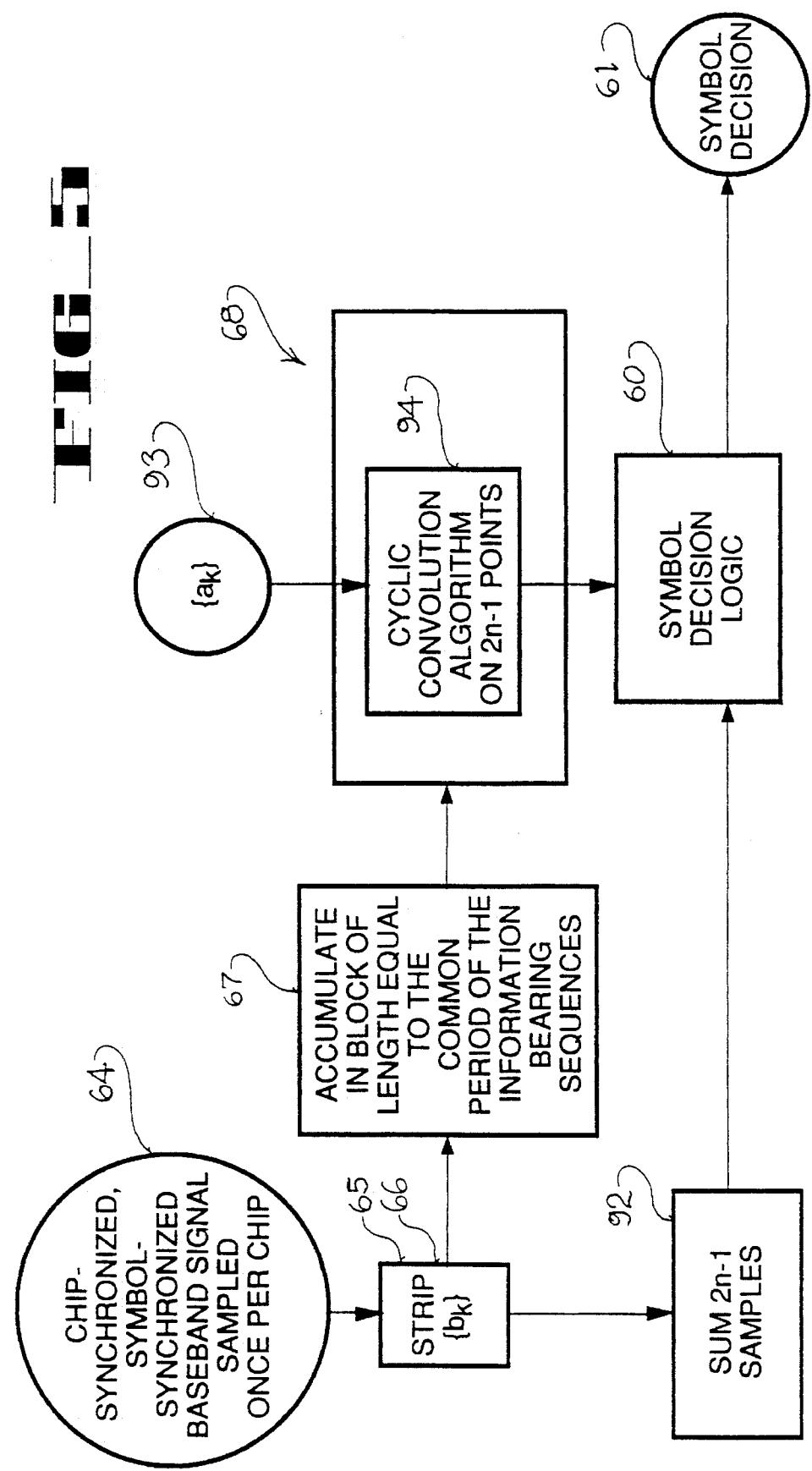
FIG. 5 is a flow chart illustrating a block correlation method using Winograd Fourier Transform Algorithms (WFTAs) and/or cyclic convolution algorithms to correlate a received signal with each possible candidate sequence.
Figure 6:
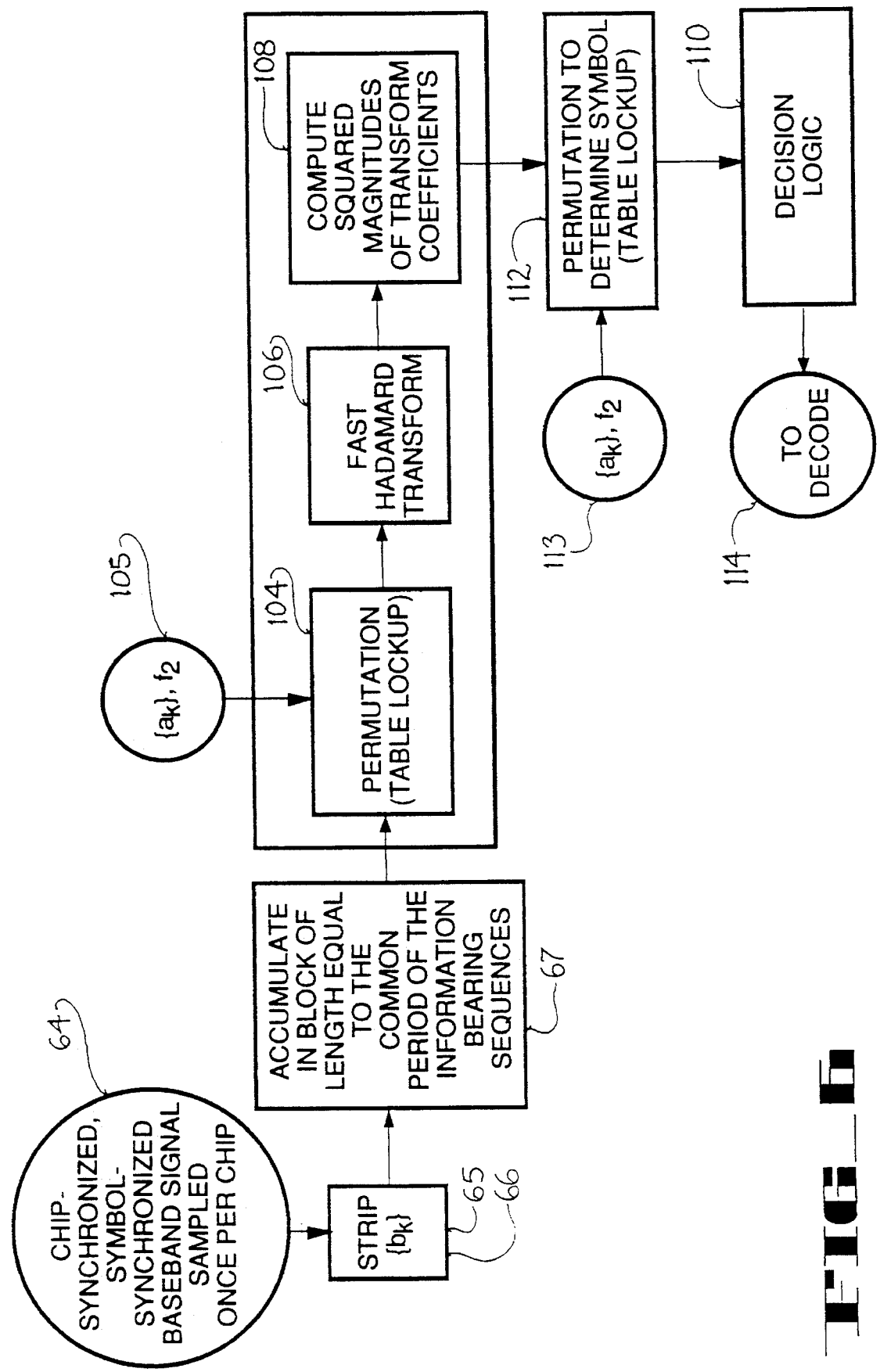
FIG. 6 is a flow chart illustrating a block correlation method using fast Hadamard transforms (FHTs) to correlate a received signal with each possible candidate sequence.

In FIG. 5, Winograd Fourier Transform Algorithms (WFTAs) and/or Winograd Convolution Algorithms or other similar algorithms are combined to achieve efficient ($2^n-1$)-point cyclic correlation. Again, $\{b_k\}$ is "stripped" 65, 66 from incoming signal$\{s_k\}$ 64 to obtain $\{qk\}$. The stripped signal is accumulated 67 over a period of the sequence $\{a_k\}$. The correlation with the all-0 sequence is the sum of the $2^n-1$ values of $\{qk\}$ 92. The remaining $2^n-1$ correlation values are obtained by computing the cyclic correlation of $\{qk\}$ 94 and $\{(-1)^{a_k}\}$ at all possible offsets 93. The values of $\{a_k\}$ at all possible offsets can be generated internally in the receiver, precalculated, and stored 93. Based on the correlation values $\{c_k\}$ from the computation, design logic decoder 60 makes a decision as to what "symbol"(sequence) 61 was transmitted.

The principal advantage of using FFTs to compute correlations of the baseband, chip-synchronized, symbol-synchronized, stripped signal with all possible offsets (phases) of $\{a_k\}$ is that efficient, optimized assembly code exists to implement the required calculations on most commercially available processors. The principal advantage of using a combination of Winograd Fourier Transform Algorithms (WFTAs), Winograd Convolution Algorithms or other efficient algorithms to compute the cyclic correlation is that no padding with O's is required and in many cases the number of arithmetic operations required will be smaller than when using FFTs.

FIG. 6 illustrates an efficient method for computing the required correlations using the Fast Hadamard Transform (FHT), or Yates' Algorithm is shown (see F. Yates, The *Design and Analysis of Factorial Experiments, Imperial Bureau of Soil Science*, Harpenden, England, 1937 and J. C. Gower, "The Yates Algorithm," *Utilitas Mathematica*, vol 21B, pp. 99–115, 1982). Chip-synchronized and frame-synchronized samples (real or complex, sampled once per chip) of received signal $\{s_k\}$ 64 are stripped of a first component spreading sequence $\{b_k\}$ 65, 66 to form a sequence $\{qk\}$ and then accumulated in a block of length equal to the common period of the sequences possibly transmitted $\{a_k\}$ 67.

The accumulated data must be rearranged into a permuted sequence 104 in order that the Hadamard transform compute the correlation of the stripped sequence with all possible offsets of $\{(-1)^{a_k}\}$ 105. The permutation can be achieved via table lookup. The table contents are precomputed and are determined by the polynomial $f_1$ as explained in Appendix A. The rearrangement 104 can occur as $\{qk\}$ 65, 66 becomes available so that the vector to be transformed is available almost immediately after the last sample of signal $\{s_k\}$ 64 is input. A FHT 106 is then computed to correlate the permuted data with all possible offsets of $\{(-1^{a_k}\}$ 105. See Appendix A for detailed explanation of the Hadamard correlation process.

After the Hadamard transform has been computed, the square of the magnitudes of the coefficients of the resulting vector are computed 108 to generate correlation values $\{c_k\}$. A permutation via table lookup is made again to identify the corresponding sequences 112. As before in 105, this permutation is based on a representation $\{a_k\}$ and $f_2$ at 113. Design logic 110 makes a decision as to what "symbol" (sequence) was transmitted. The largest squared output of the Hadamard block correlator corresponding to a valid offset corresponds to the most likely sequence. The correspondence between the indices of the Hadamard transform coefficients and the offsets are given in Appendix A.

In a preferred embodiment, to ensure that the data received is of good quality, an "erasure" is declared unless the largest squared correlation magnitude exceeds the second largest by a pre-selected threshold, TH. An error occurs when the squared magnitude of the correlation of the input signal and an incorrect sequence exceeds the squared magnitude of the correlation of the signal with the sequence actually transmitted by a factor of at least TH. An erasure occurs when the ratio of the largest squared correlation magnitude to the next-largest squared correlation magnitude is less than TH.

The value chosen for TH depends principally on the required bit error rate, data rate, and complexity of coding/decoding acceptable. Normally, TH=1 provides optimum performance in that data throughput is highest for a given error rate. However, in cases when data integrity is extremely important (errors are more costly than erasures) increasing TH can dramatically decrease the probability of error at the expense of also decreasing the probability of detection. Detected symbols and erasures are interpreted by the error correcting code logic employed to correct the erased or incorrect symbols, or to declare a "block erasure" when too many erasures have occurred. Reed-Solomon codes are especially well suited to this purpose.

A Reed-Solomon code of minimum distance d can correct a pattern of r erasures and e errors provided that r+2e<d. If d or more erasures occur, the decoder will not attempt correction and will declare that an uncorrectable word has been received. Thus, for example, if TH is chosen so that the probability of an error is much less than ⅛ th that of an erasure, then a received word that contains no more than 4d/5 erasures is unlikely to contain more than d/10 errors. If the decoder does not attempt to decode blocks with more than 4d/5 erasures, then the probability is very small that a block will be incorrectly decoded. In practice, TH must be chosen to provide an acceptable balance between r and e. If the largest squared correlation magnitude corresponds to the actually transmitted sequence, then the ratio of the largest squared correlation magnitude to the next largest is the ratio of a non-central chi-square random variable and an order statistic, the maximum of a collection of $2^m-1$ chi-squared random variables, where $2^m$ is the number of possible sequences. The probability density function of the ratio of these random variables is complicated but calculable, and thus the probability of a correct decision as a function of sequence length, signal-to-noise ratio, and TH is can be obtained in a straightforward manner.

As an example, the probability that the largest of 511 samples from a $\chi_1^2$ distribution exceeds the next-largest by a factor of 2 is about $10^{-2}$. Thus, if TH=2, then during a fade, for every decision (and consequent probable error) 100 erasures are expected. In general, if it is desired that pr( (largest $\chi_1^2$)/(next-largest $\chi_1^2$>TH) )<$\epsilon$, then it can be shown that TH can be chosen by the formula TH=1+(1/aN) ln (1/$\epsilon$), where aN=−1.5+ln (4+N), N being the number of $\chi_1^2$ samples.

After the most likely sequence is decided 110, the Hadamard transform coefficients are permuted again to determine the symbol (sequence) 112 before decoding 114. Unlike the QUALCOMM method, the incoming data are permuted prior to applying the Hadamard transform, and then the Hadamard transform coefficients are permuted again to obtain the correlation values at successive offsets (see Appendix A).

The FHT approach has the following advantages, among others, over the FFT method: (1) no padding with O's is required; (2) the sum Σqk is included in the calculation of the FHT, whereas it is a separate calculation if FFTs are used; and (3) only 2n×2n additions/subtractions (no multiplications) are required, implying a computational advantage over the FFT method of at least an order of magnitude. The disadvantage is that the input data must be shuffled prior to performing Yates' algorithm (the FHT). If the permutation is "in-place"(to conserve memory), then it adds appreciably to the computational cost of the algorithm. Alternatively, once synchronization is achieved, the incoming samples $\{q_k\}$= $\{(-1)^{b_k}s_k\}$ can be inserted into their correct positions in the vector to be transformed as they become available, so that the FHT can be computed immediately after the last sample is stored.

Whether the FFT or FHT method is employed, the number of calculations performed is independent of the number of sequences employed by the sender and therefore of the number of correlation coefficients that are actually of interest. Unless the number of sequences employed is relatively small, the transform methods are still preferable to independent correlations with each of the possible spreading sequences.

The computational requirements associated with implementing an FFT transform and a Hadamard transform are shown in Appendix B. Generally, the number of arithmetic operations required for the FHT method is more than an order of magnitude smaller than the number required using FFTs. Also, the decoding process is parallelizable, since different symbols can be processed by different processors. Thus, multiple processors could be employed, with the received symbols (sequence segments) allocated cyclically to the available processors. For commonly used chip rates (rates at which the sequence generators step), computational requirements are well within the capabilities of current technology.

Sequence Generator w/Informationless Component

To utilize the FHT or FFT as a "block correlator," it is necessary that signal $\{s_k\}$ be brought accurately to baseband (carrier frequency=0). Otherwise, carrier oscillations could diminish the magnitude of the correlation of the signal with the correct offset (u, v) of the M-sequence. Thus, accurate carrier recovery and subsequent heterodyning of the signal $\{s_k\}$ to baseband is critical to good performance. This is especially important when the signal is subject to drifts (e.g., due to hardware instabilities) or to significant Doppler shifts.

In conventional direct sequence spread spectrum systems, carrier recovery is achieved after chip and sequence synchronization. The synchronized spreading sequence is mixed with the incoming signal (e.g., $\{s_k\}$), thereby "stripping" the spreading code from the signal and "spectrally collapsing" it from a wideband signal with low signal-to-noise ratio (SNR) to the "information bandwidth," where the despread narrow-band signal now has positive SNR. The carrier is then recovered using conventional means, such as a squaring circuit, phase-locked loops or other methods traditionally applied to high-SNR signals.

This traditional approach to carrier recovery will not work in multiple-sequence systems since the particular sequence transmitted (e.g., offset of $\{a_k\}$) is not known a priori and cannot therefore be mixed with the incoming signal to collapse it and recover the information signal. This can be a significant problem in mobile, underwater, or other applications in which Doppler frequency shifts of significant size and variability can occur.

Figure 7:
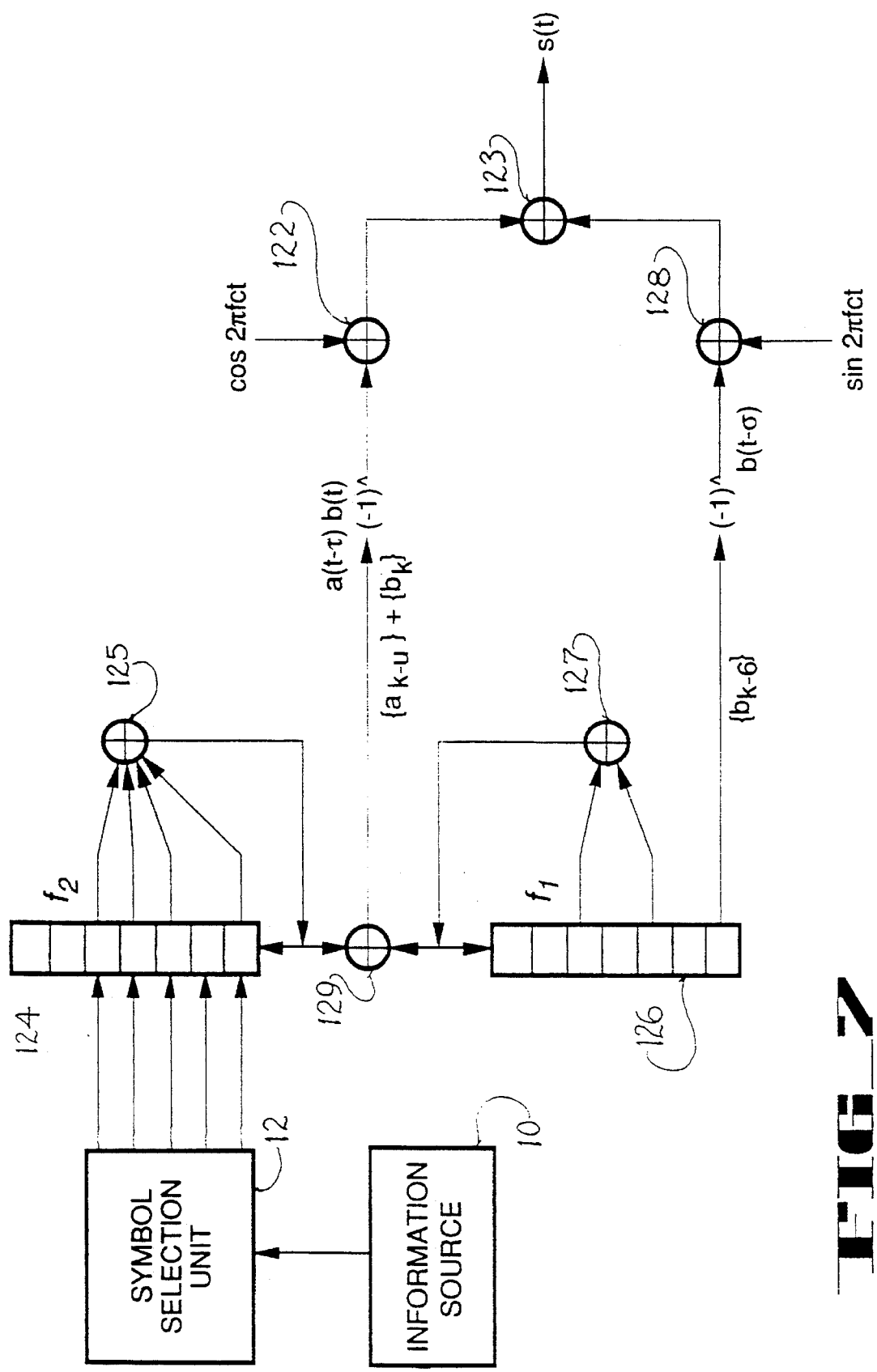
FIG. 7 is a schematic illustration of a sequence generator in which an informationless, or pilot, signal is transmitted along with the information-bearing signal.

FIG. 7 is a schematic illustration of a sequence generator in which an informationless, or pilot, sequence b(t) is transmitted along with the information-bearing signal a(t). Information source 120 generates information bits i(t). Symbol unit 122 makes use of the 2n sequences and codes the bits into n-bit blocks where n is the degree of the polynomial $f_2$ corresponding to the feedback taps in upper register 124 (degree 5 in FIG. 7). The block of n-bits is shifted into upper register 124 at the beginning of the next symbol period by symbol selection unit 122. The bits from the upper register 124 and lower register 126 are added mod 2 at 125, 127, 129, and the resulting bit stream (generally interpreted as +1's and −1's rather than O's and 1's, thus the "(−1)δ" conversion) a(t) modulates 122 a sinusoidal carrier shown as cos2π$f_c$t, where $f_c$ is the carrier frequency. This modulated sinusoid comprises the "in-phase arm" or "I-arm" of the transmitted signal. Lower register 126 is shown as having the same degree as that driving upper register 124 (degree "5" in FIG. 7). This symmetry is not necessary; in fact, the bits on lower register 126 can, in principle, be completely random and/or be derived from a different source.

Bits from any other stage of lower register 126 create a "pilot" sequence b(t) that modulates 128 a sinusoidal carrier in quadrature (90 degrees out of phase, but of the same frequency) to form the "quadrature-arm" or "Q-arm" of the signal. There is no requirement that sequence b(t) modulating the Q-arm of the signal be derived from lower register 126, although it is generally more convenient. There is also no requirement that the I-arm and Q-arm be transmitted with the same power. The I-arm and Q-arm (a(t) and b(t)) are summed 123 and transmitted to form signal $\{s_k\}$.

In a receiver, an internally generated replica of the (constant envelope) informationless Q-arm b(t) is mixed with the received signal $\{s_k\}$. The Q-arm is spectrally collapsed to a sinusoid if and only if the timing offset is correct. That is, since the sequence modulating the quadrature carrier is a known delay of the sequence $\{b_k\}$, the presence of a spectrally collapsed signal after mixing indicates that synchronization has been acquired.

Receiver Of Signal w/Informationless Component

FIG. 8 illustrates one embodiment of a carrier recovery system for a signal that includes an information-bearing signal a(t) and pilot signal b(t) (as generated, for example, in FIG. 7). Ignoring noise, incoming signal s(t) is defined by a(t-τ) b(t)cos(2πft+φ)+b(tσ)sin(2πft+φ) where τ corresponds to the offset u of the sequence $\{a_{k-u}\}$, φ is an arbitrary phase term, σ is the delay between the sequence modulating the quadrature carrier, b(t), and the informationless component $\{b_k\}$ of the I-arm (2 chip durations as shown in the configuration of FIG. 7), and f is the possibly shifted or varying carrier frequency. In this representation, s(t), a(t), and b(t) represent the continuous waveform versions of the sampled waveforms $\{s_k\}, \{(-1)^{a_k}\}, \{(-1)^{b_k}\}$ respectively.

The "phase" or offset sequence of a(t) is $\tau$, therefore, the value of the phase $\tau$ conveys the transmitted information during any given symbol interval. The signal s(t) is despread and synchronized 130 by multiplying it by a receiver-generated replica of pilot waveform $b(t-\sigma)$. In practice, a sequential search and delay-lock-loop or other standard method can be used for synchronization (alignment of the internally generated version of b(t) and the received signal) and track.

After multiplication of s(t) by $b(t-\sigma)$, the resulting signal is filter centered at $f_c$ in bandpass filter 132. Bandpass filter 132 is centered at the nominal carrier frequency $f_c$ and its bandwidth should be as narrow as possible but still able to capture the carrier. The passband of disjoint filter 131 is disjoint from that of the bandpass filter 132. Energy measurements $E_1$, $E_2$ at the outputs of the two filters 131 and 132, respectively, are made over a specified time interval and compared. If $E_1/E_2 < TH$, for some threshold TH 133, then the phase of b(t) is "coarse" shifted by a specified fraction of a chip duration and the process is repeated 134. If $E_1/E_2$ equals or exceeds TH 133, it is assumed that synchronization has been achieved, and the receiver changes from acquisition mode to track mode and the "fine" phase shifts of b(t) are dictated by the operation of an acquisition mode tracker such as a delay lock loop or other similar method 13 S. Adjustments to b(t) are thus appropriately made 139.

The output of filter 132 is input to a phase detector or similar device 134 that performs a "limiting" function to remove amplitude variations in the collapsed carrier so that they are not squared in the subsequent multiplication (140). The despread Q-arm is a sinusoid at the carrier frequency defined by $\sin(2\pi ft+\phi)$. Thus, in addition to providing a convenient method for obtaining and maintaining synchronization, the despread Q-arm contains carrier information that can be used to accurately bring the signal to baseband. A 90-degree phase shift 136 brings the collapsed Q-arm carrier into phase with the I-arm carrier 138. The resulting signal is the reconstructed carrier defined by $\cos(2\pi ft+\phi)$.

The reconstructed carrier 138 is then multiplied 140 by the incomming signal $a(t-\tau) b(t)\cos(2\pi ft+\phi)+b(t-\sigma)\sin(2\pi ft+\phi)$. It is then multiplied by the properly phase adjusted b(t). The resulting signal is passed through low pass filter (LPF) 142 to produce the baseband signal of the form $a(t-\tau)$ (since $b^2(t)=1$). This baseband signal is then correlated with an internally generated replica of waveform a(t) at all offsets to determine the offset $\tau$. In practice, delays associated with filtering, limiting or phase detection, and phase shifting or carrier generation must be compensated within the system.

Forward Error Correction Coding w/Informationless Signal

Forward error correction coding can also be accomplished in a transmitter employing a pilot sequence b(t). In a conventional receiver, the functions that are associated with the error correction coding scheme are performed independently of chip, bit, and sequence synchronization and carrier recovery. If a block code is used, error correction coding also includes block synchronization and decoding. Usually, convolutional coding is employed (as in the QUALCOMM system), which eliminates the requirement for block synchronization.

However, block codes have unique advantages over convolutional codes in multiple-sequence spread spectrum systems. Reed-Solomon codes, for example, correct symbols rather than bits. In a multiple sequence spread spectrum system, each symbol (sequence) represents a block of bits.

Errors are manifested as symbol errors. Moreover, the symbols are "uncorrelated," in that the sequences are almost orthogonal, so that all incorrect symbols are equally likely to be erroneously detected. This is unlike the case, for example, for signals modulated using quadrature-amplitude modulation (OAM), where certain pairs of symbols (amplitude-phase states) are "closer together" than others. Thus, for multiple-sequence spread spectrum systems, there is no advantage in "Gray coding" the symbols to attempt to reduce the number of bit errors in an erroneously detected symbol.

FIG. 9 illustrates a system in which forward error correction coding is combined with transmission of a Q-arm. An information sequence $\{i_k\}$ is input to encoder 150 for a block code. In one embodiment, the block length of the code is an integral multiple of the period of the informationless sequence $\{b_k\}$, and the period of $\{b_k\}$ is an integral multiple of the common period of the information-bearing sequences $\{a_{k-u}\}$. For example, a modified Reed-Solomon code can be designed such that twice the period of the informationless sequence $\{b_k\}$ and is equal to the blocklength of the error correcting code 150, given that the degree of polynomial $f_1$ generating $\{b_k\}$ is twice the degree of the polynomial, $f_2$, generating $\{a_k\}$. As in FIG. 9, the feedback taps of upper 154 and lower 156 registers can be chosen in such a way that an integral number of information symbols in $\{a_k\}$ (degree 5) are transmitted per period of the informationless sequence $\{b_k\}$ (degre 10 or 15).

Symbol selection unit 152 accepts the encoded bit from encoder 150. If $2^m$ sequences are assigned to a user, where m is less than or equal to n, n being the degree of polynomila $f_2$ corresponding to the feedback taps in upper register 154, then unit 152 partitions the bits into m-bit blocks. A block of m-bits is then associated with an n-bit pattern which is shifted into upper register 154 at the beginning of the next symbol period by symbol selection unit 152.

As in FIG. 7, the bits from the upper register 154 and lower register 156 are added mod 2 at 155, 157, 158 and the resulting bit stream, $\{a_{k-u}\}+\{b_k\}$, modulates a sinusoidal carrier 159 shown as $\cos 2\pi f_c t$, where $f_c$ is the carrier frequency. An offset of $\{b_k\}(\{b_{k-2}\}$ in FIG. 9 ), modulates a quadrature carrier to form the Q-arm of the signal. The I-arm and the Q-arm are summed 159 to form the transmitted signal s(t).

In the receiver, consecutive symbols are combined to form an element of a codeword. The beginning of a codeword coincides with the initial phase of the sequence. Thus, the error correction code, the information symbols (the sequences of $\{a_{k-u}\}$), and the informationless sequence $\{b_k\}$ are jointly synchronized in the receiver by synchronizing with the pilot sequence $b(t-\sigma)$, where $b(t-\sigma)$ is the "continuous waveform" version of the offset sequence ($\{b_{k-2}\}$ in FIG. 9 ).

For illustrative purposes in FIG. 9, upper register 154 generating sequences corresponding to information symbols has a feedback span of 5 taps, so that the sequence length is 31 chips ($2^n-1$). The feedback span of the informationless signal in lower register 156 is 10 (or 15), with the feedback taps chosen in such a way that the sequence generated has a period of $2^{10}-1=1023$ (or $2^{15}-1=32767$). There are 33 (or 1057) 31-bit sequences transmitted per 1023-bit (32767-bit) period, assuming that the feedback in lower register 156 has degree 10 (15). Therefore, it is convenient if the block length of a modified Reed-Solomon code is (a small multiple of) 33. In this case, synchronization of the codeword coincides with synchronization of the Q.-arm b(t). This can be achieved by using a Reed-Solomon code of block length 33 over $GF(2^{10})$ (1057 over $GF(2^{15})$) and blocking 10 (15) bits (two (three) consecutive received symbols) as elements of a received 33-symbol (1057-symbol) word. Such a word spans two (three) periods of the 1023-bit (32767-bit) sequence. In one embodiment, to facilitate synchronization of the code blocks, the polarity of the transmitted sequences are inverted after two (three) consecutive sequence periods. A polarity inversion indicates the boundary of a codeword. Other modifications of this technique are also possible. For example, if a non-primitive degree-15 polynomial is used in the previous example, a sequence of period 31 * 151=4681 can be generated. In general any divisor of $2^{kn}-1$ can be used, where k is a positive integer. The block length of the modified Reed-Solomon code over $GF(2^{15})$ is then 151, and three periods of 4681 comprise a block.

The symbol-oriented coding/decoding approach of the present invention is superior to a bit-oriented approach for multiple-sequence spread spectrum systems. Symbol-oriented coding/decoding schemes have not been used in previously developed spread spectrum systems. The QUAL-COMM system uses interleaving combined with convolutional codes, presumably because of the ready availability of convolutional coding/decoding hardware. For conventional, single-sequence systems, Reed-Solomon or other block-oriented codes offer no particular advantage over convolutional codes, especially if interleaving is employed.

The above description is included to illustrate the operation of the preferred embodiments and is not meant to limit the scope of the invention. The scope of the invention is limited only by the following claims. From the above discussion, many variations will be apparent to one skilled in the art that are yet encompassed by the spirit and scope of the invention.

APPENDIX A

All operations in the following (except for sums of subscripted indices) take place over GF(2), the field of two elements. The cyclic correlations $\{C_0, C_1, \ldots, C_{2^n-2}\}$ at successive offsets between a $(2^n-1)$-long sequence $\{Y_0, Y_1, \ldots, Y_{2^n-2}\}$ of real or complex numbers and a binary sequence $\{u_0, u_1, \ldots, u_{2^n-2}\}$ of the same length are defined by the equations:

$$c_k = \sum_{i=0}^{2^n-1} y_i(-1)^{u_{i+k}}, 0 \leq k \leq 2^n - 2.$$

The Hadamard transform of a $2^n$-long sequence $\{z_0, z_1, \ldots, z_{2^n-1}\}$ is defined to be the set of transform coefficients $\{Z_s\}$, defined by $$Z_s = \frac{1}{2^n} \sum_{k=0}^{2^n-1} (-1)^{\bar{k}\cdot\bar{s}}$$

where $\bar{k}\cdot\bar{s}$ denotes the dot product of the vectors $\bar{k}$ and $\bar{s}$ consisting of the n-long binary representation of the integers R and s, respectively (that is, if $$k = \sum_{i=0}^{n-1} k_i 2^i, \text{ then } \bar{k} = (k_0, k_1, \ldots, k_{n-1})).$$

The convolution coefficients $\{c_k\}$ may be obtained as a permutation of the coefficients of a Hadamard transform applied to a padded and reordered version of the sequence $\{y_k\}$. To show this, it is necessary to discuss some concepts from the theory of finite fields.

Suppose that f(x) is a polynomial of degree n in GF(2)[x] (the set of polynomials in the variable x with coefficients in GF(2)), given by $$f(x) = x^n \oplus \sum_{i=0}^{n-1} f_i x^i$$

(Here, $\Sigma$ denotes a sum in GF(2)[x]). A linear recursive sequence satisfying f is a sequence $\{u_k\}$ such that $u_{k+1} = f_0 u_k \oplus f_1 u_{k-1} \oplus \ldots \oplus f_{n-1} u_{k-n+1}$, and f is said to "generate"$\{u_k\}$. If $\{u_k\}$ is a maximal-length linear recursive sequence ("M-sequence", or MLLRS) of period $2^n-1$, then f is said to be "primitive." The "companion matrix" of f is defined to be $$A = \begin{bmatrix} f_0 & f_1 & \ldots & f_{n-2} & f_{n-1} \\ 1 & 0 & \ldots & 0 & 0 \\ 0 & 1 & \ldots & 0 & 0 \\ \vdots & \vdots & \ldots & \vdots & \vdots \\ \vdots & \vdots & \ldots & \vdots & \vdots \\ 0 & 0 & \ldots & 1 & 0 \end{bmatrix}.$$

If $\{u_k\}$ is a linear recursive sequence over GF(2) satisfying f(x), let $\underline{u}_k$ denote the column vector $$\underline{u}_k = \begin{bmatrix} u_{k+n-1} \\ \vdots \\ \vdots \\ u_{k+1} \\ u_k \end{bmatrix}.$$

Then, $Af \underline{u}_k = \underline{u}_{k+1}$. That is, multiplication of a "fill"$\underline{u}_k$ by $A_f$ shifts a register "driven by f" to produce the next fill, $\underline{u}_{k+1}$. Thus, $\underline{u}_k = A_f^k \underline{u}_0$. If f is primitive of degree n, then a sequence of $2^n-1$ successive fills of a register driven by f consists of a permutation of all of the non-zero binary n-tuples. Let $$\underline{e} = \begin{bmatrix} 0 \\ 0 \\ \vdots \\ \vdots \\ 1 \end{bmatrix},$$

and suppose $\underline{e}^T$ denotes the transpose of $\underline{e}$. Let $\underline{e}_k = (Af^T)^k \underline{e} = (e_{ki})$. Then, $\underline{u}_k = \underline{e}^T \underline{u}_k = \underline{e}^T A_f^k \underline{u}_0 = \underline{e}_k^T \underline{u}_0$.

Now suppose that f is primitive and define $\{z_0, z_1, z_2, \ldots, z_{2^n-1}\}$ by $z_0 = 0$ and $z_{e_i} = Y_i$, $0 \leq i \leq 2^n-2$ (here, $\underline{e}_i$ is used as a subscript indicating the integer, $g_i$, say, that has $\underline{e}_i$ as its binary representation; that is, $\overline{\gamma}_i = \underline{e}_i$). Define $\{d_1, d_2, \ldots, d_{2^n-1}\}$ by $d_{u_k} = C_k$, $0 \leq k \leq 2^n - 2$, where the vector $u_k$ is similarly used as a subscript. Since f is primitive, these correspondences are one-to-one. Then, $$d_k = \sum_{i=0}^{2^n-1} z_i (-)^{i \cdot k}, 1 \leq k \leq 2^n - 1.$$

Let $$d_0 = \sum_{i=0}^{2^n-1} z_i = \sum_{j=0}^{2^n-2} y_j.$$

the correlation of $\{Y_i\}$ with the all-0 sequence (the "other" sequence generated by f). Then, $\{d_k\}$ is the Hadamard transform of $\}z_i\}$, which is obtained by setting $z_0 = 0$ and then filling the position with binary representation $\underline{e}_k$ in the vector $\underline{z} = (z_i)$ with $y_k$, for $0 \leq k \leq 2^n - 2$. The coefficients $\{d_1, d_2, \ldots, d_{2^n-1}\}$ are a permuted version of the correlation coefficients $\{C_O, \ldots, c_{2^n-2}\}$. Thus, the cyclic correlation of the data sequence $\{y_i\}$ and the M-sequence $\{u_k\}$ can be computed by appropriately rearranging $\{y_i\}$ and appending a 0, computing the Hadamard transform, and then permuting the transform coefficients.

APPENDIX B $n2^n$ complex additions and subtractions are required to compute a $2^n$-point FHT on $2^n$ points. By comparison, the number of multiplications/additions required for a complex FFT of length $2^{n+1}$ is approximately $5(n+1)2^{n+1}$. The FFT of the 0-padded version of $\{(-1)^{a_k}\}$ can be precomputed and thus does not carry any computational burden. The $2^{n+1}$ complex multiplications required to compute the product of the transforms require $4 \times 2^{n+1}$ multiplications and $2 \times 2^{n+1}$ additions. The computation of $\Sigma qk$ requires $2(2^n - 2)$ additions. The total number of operations to perform one correlation is, therefore, approximately $2(5(n+1)2^{n+1}) + 7 \times 2^{n+1} = (20n+34) \times 2^n$. The ratio of operations is therefore more than 10. Thus, the number of arithmetic operations required for the FHT correlation is more than an order of magnitude smaller than the number required using FFTs.

As an example of the order of computation required, if the period is 1023 and the chip rate is 10.23 MHz, then 10000 1024-point Hadamard Transforms per second must be computed and their outputs processed. The computational requirements are slightly less that 100 Mflops. Also, the decoding process is parallelizable, since different symbols can be processed by different processors. Thus, multiple processors could be employed, with the received symbols (sequence segments) allocated cyclically to the available processors. Consequently, computational requirements are well within the capabilities of current technology.

I claim:

1. In the detection of a multi-sequence spread spectrum signal, a block correlation method for generating correlation values associated with a received signal and a plurality of candidate sequences, the method comprising:

receiving a signal comprising a first transmitted sequence and a second transmitted sequence;

stripping the second transmitted sequence from the received signal to form a stripped signal; and generating correlation values as a function of the stripped signal and a replica of the first transmitted sequence at a plurality of offsets, wherein the generating step comprises the substeps of:

padding the stripped signal with zeroes to form a first extended data sequence;

generating a first set of coefficients by performing a discrete Fourier transform on the first extended data sequence;

padding a replicated first transmitted sequence with zeroes to form a second extended data sequence;

generating a second set of coefficients by performing a discrete Fourier transform on the second extended data sequence;

generating a set of product coefficients by multiplying each coefficient in the first set by the complex conjugate of a corresponding coefficient in the second set; and generating correlation values by computing the inverse discrete Fourier transform of the product coefficients.

2. The method of claim 1 further comprising:

determining the first transmitted sequence of the received signal as a function of the correlation values.

3. The method of claim 1 wherein the complex conjugates of the second set of coefficients are pre-calculated and stored.

4. In the detection of a multi-sequence spread spectrum signal, a block correlation method for generating correlation values associated with a received signal and a plurality of candidate sequences, the method comprising:

receiving a signal comprising a first transmitted sequence and a second transmitted sequence:

stripping the second transmitted sequence from the received signal to form a stripped signal:

generating correlation values as a function of the stripped signal and a replica of the first transmitted sequence at a plurality of offsets: and selecting a subset from the correlation values generated.

5. In the detection of a multi-sequence spread spectrum signal, a block correlation method for generating correlation values associated with a received signal and a plurality of candidate sequences, the method comprising:

receiving a signal comprising a first transmitted sequence and a second transmitted sequence:

stripping the second transmitted sequence from the received signal to form a stripped signal; and generating correlation values as a function of the stripped signal and a replica of the first transmitted sequence at a plurality of offsets, wherein the correlation values are generated by computing a fast cyclic convolution algorithm on the stripped signal and a replica of the first transmitted sequence at a plurality of offsets.

6. In the detection of a multi-sequence spread spectrum signal, a block correlation method for generating correlation values associated with a received signal and a plurality of candidate sequences, the method comprising:

receiving a signal comprising a first transmitted sequence and a second transmitted sequence;

stripping the second transmitted sequence from the received signal to form a stripped signal; and generating correlation values as a function of the stripped signal and a replica of the first transmitted sequence at a plurality of offsets, wherein the generating step comprises the substeps of:

permuting the stripped signal to form permuted data;

and generating correlation values by performing a Hadamard transform on the permuted data.

7. The method of claim 6 further comprising:

computing the squared magnitudes of the generated correlation values; and permuting the squared magnitudes of the generated correlation values to determine the first sequence of the received signal.

8. In a multi-sequence spread spectrum signal detector, a block correlator apparatus comprising:

a receiver for receiving a signal comprising a first transmitted sequence and a second transmitted sequence;

coupled to the receiver, a multiplier for multiplying the received signal by a replica of the second transmitted sequence to generate a stripped signal; and coupled to the multiplier, a block correlator for generating correlation values as a function of the stripped signal and a replica of the first transmitted sequence at a plurality of offsets, wherein the block correlator generates correlation values as a function of a Hadamard transformation.

9. The apparatus of claim 8 further comprising:

coupled to the block correlator and the multiplier, a permuter for permuting the stripped signal prior to block correlation in the Hadamard transformation.

* * * * *